United States Patent [19]

Engström

[11] Patent Number: 4,747,852

[45] Date of Patent: May 31, 1988

[54] METHOD AND APPARATUS FOR SEPARATING SOLID PARTICLES FROM FLUE GASES IN A CIRCULATING FLUIDIZED BED REACTOR

[75] Inventor: Folke Engström, San Diego, Calif.

[73] Assignee: A. Ahlstrom Corporation, Karhula, Finland

[21] Appl. No.: 902,407

[22] PCT Filed: Jan. 9, 1986

[86] PCT No.: PCT/FI86/00002
§ 371 Date: Aug. 25, 1986
§ 102(e) Date: Aug. 25, 1986

[87] PCT Pub. No.: WO86/03986
PCT Pub. Date: Jul. 17, 1986

[30] Foreign Application Priority Data
Jan. 11, 1985 [FI] Finland .................. 850134

[51] Int. Cl.⁴ .................. B01D 45/12; B04C 9/00; F27B 15/12
[52] U.S. Cl. .................. 55/1; 55/338; 55/431; 422/145; 422/147; 423/659
[58] Field of Search .................. 422/145, 147; 55/431, 55/1, 338; 423/659, 244 S; 208/161; 209/144

[56] References Cited

U.S. PATENT DOCUMENTS

| | | |
|---|---|---|
| 2,750,258 | 6/1956 | Jukkola et al. .................. 422/145 |
| 2,788,087 | 4/1957 | Lenehan . |
| 2,890,764 | 6/1959 | Arnold .................. 55/338 |
| 3,265,775 | 8/1966 | Friedrich . |
| 3,545,735 | 12/1970 | Wolf et al. . |
| 4,279,624 | 7/1981 | Wilson .................. 55/431 |
| 4,311,670 | 1/1982 | Nieminen et al. .................. 422/145 |
| 4,426,359 | 1/1984 | Woebcke et al. .................. 422/145 |
| 4,477,339 | 10/1984 | Whaley et al. .................. 209/144 |
| 4,552,203 | 11/1985 | Chrysostome et al. .................. 422/145 |
| 4,597,774 | 7/1986 | Carcia-Mallol et al. .................. 422/145 |

FOREIGN PATENT DOCUMENTS

| | | |
|---|---|---|
| 1010687 | 6/1957 | Fed. Rep. of Germany . |
| 2124776 | 12/1972 | Fed. Rep. of Germany ...... 422/145 |
| 3124832 | 1/1983 | Fed. Rep. of Germany . |
| 969129 | 12/1950 | France .................. 55/431 |
| 1368964 | 6/1964 | France . |

Primary Examiner—David L. Lacey
Attorney, Agent, or Firm—Nixon & Vanderhye

[57] ABSTRACT

A method and an apparatus for separating coarse and fine solid particles from flue gases in a circulating fluidized bed reactor provide for flue gases to be led to a cyclone separator, located adjacent the reactor. A discharge opening is provided in the lower portion of the separator, opening into a suction chamber interposed between the discharge opening and a return duct. Coarse particles are returned to the reactor via the return duct while fine particles are pulled into a suction pipe connected to the suction chamber, and are then returned to the reactor separately from the coarse particles. At the same time, a minor portion of the flue gases are removed through the discharge opening in the separator with the solid particles and returned to the reactor. The major portion of the flue gases is discharged through an opening in the upper portion of the separator.

11 Claims, 2 Drawing Sheets

METHOD AND APPARATUS FOR SEPARATING SOLID PARTICLES FROM FLUE GASES IN A CIRCULATING FLUIDIZED BED REACTOR

BACKGROUND AND SUMMARY OF THE INVENTION

The present invention relates to a method and an apparatus for separating solid particles from flue gases in a circulating fluidized bed reactor, in which method the flue gases are led to a cyclone separator in which the separated solid particles are discharged and returned to the reactor.

The object of the invention is to provide a device by means of which the solid particles can be not only separated effectively from the flue gases, but also separated into coarse and fine particles which are returned separately to the reactor.

The circulating fluidized bed technique has long been applied, e.g., in calcinators, and is now often utilized in various reactors, such as combustion chambers and gasifiers. In known applications, the separation of solid particles from flue gases takes place in the lower part of a funnel-shaped cyclone separator, and, specifically, in the cylindrical vortex chamber of the separator, in which is disposed a gas outlet pipe that leads the flue gases upwards, and from which the solid particles are returned to the reactor via a discharge pipe.

A strong underpressure and a high axial flow speed are, as known, formed in the center of conventional cyclone separators. Due to this, an ordinary cyclone tends to create suction in the discharge pipe. The resulting suction flow does not usually have a tangential speed and consequently all particles transported with it are led out via the central pipe of the cyclone.

The solid material discharged with gas from the separator is mainly fly ash containing particles smaller than 100 $\mu$m, which is later separated by means of electro- or tube filters. Fly ash contains considerable amounts of unburnt particles and lime that has not had time to react with $SO_2$ in the reactor. In addition, the separation degree of a cyclone separator decreases with the growth of the size of the cyclone.

In the method according to this invention, a considerable part of the flue gas particles smaller than 100 $\mu$m can be separated from the coarser particles and returned to the reactor.

The method according to this invention is characterized in that solid particles are discharged from a cyclone separator by means of suction.

The apparatus according to the invention is characterized in that between the lower part of the funnel-shaped cyclone separator and the return duct for the larger solid particles there is disposed a suction chamber for separating and removing the finer particles.

BRIEF DESCRIPTION OF THE DRAWINGS

The invention is described in detail below, with reference to the accompanying drawings, in which.

DETAILED DESCRIPTION OF THE INVENTION

Figure 1:
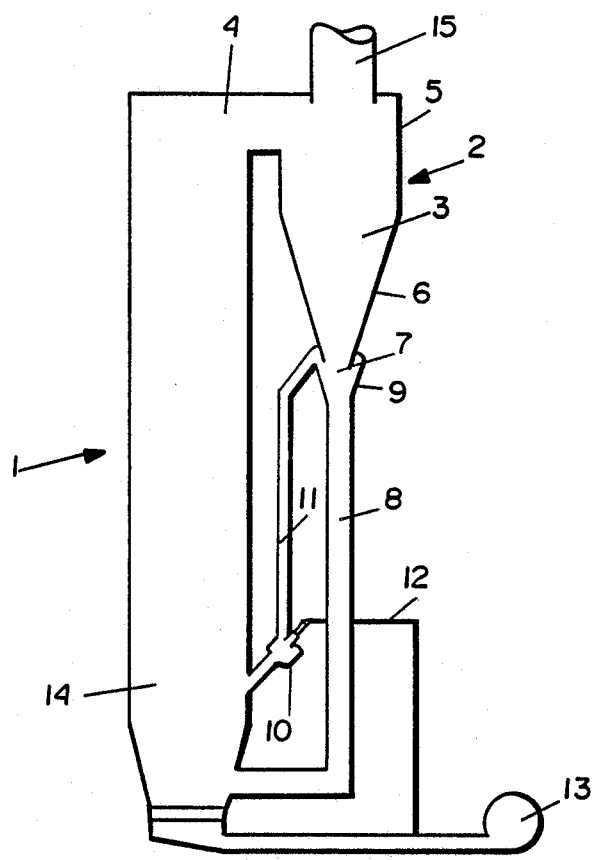
FIG. 1 shows a schematical vertical section of one embodiment according to the invention.

In FIG. 1, a vertical circulating fluidized bed reactor is illustrated in schematic form. Flue gases leaving the upper part of the reactor are fed tangentially, via an inlet duct 4, to a vortex chamber 3 disposed vertically in a cyclone separator 2. The upper part 5 of the vortex chamber 3 is cylindrical and the lower part 6 is funnel-shaped. Solid particles concentrated on the periphery of the vortex chamber flow to a return duct 8 via a discharge opening 7 provided in the lower part of the vortex chamber, and are led back to the reactor. Between the discharge opening 7 and the return duct is disposed a suction chamber 9 to which a pneumatic ejector 10 and a suction pipe 11 have been connected. Compressed air is supplied to the ejector, via a duct 12, from a fan 13. A flow outlet of the ejector 10 is connected to a combustion chamber 14 of the reactor.

The ejector creates suction in the discharge opening 7 of the cyclone separator. This causes a gas flow from the lower part of the separator 2 to the suction chamber 9. In this gas flow are fine particles concentrated in the lower part of the separator which are then returned to the reactor via the ejector 10. The main portion of the particles discharged from the separator are removed through the return pipe 8. By means of the compressed air that functions as an operating gas for the ejector and as a secondary gas for the reactor, 1-30%, and preferably abut 10% of the flue gases from the combustion chamber, are removed through the lower part of the separator and returned to the combustion chamber. The main part of the gases are discharged via a gas discharge pipe 15 in the upper part of the separator.

Figure 2:
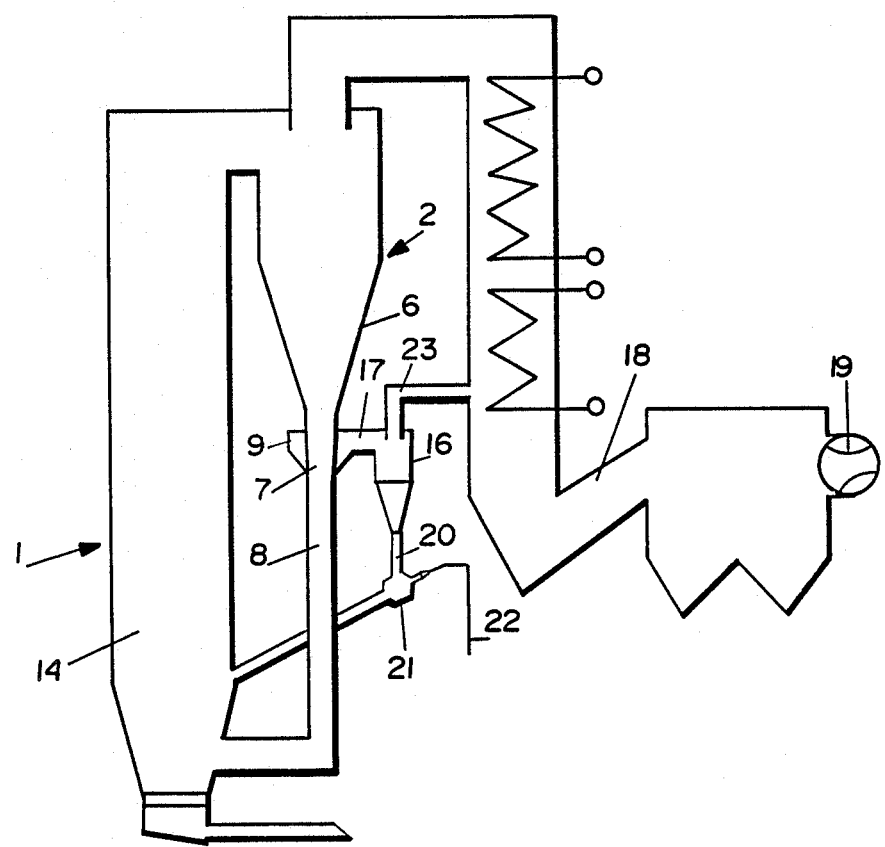
FIG. 2 shows an alternative embodiment of the invention.

In the embodiment of the invention shown in FIG. 2, a suction chamber 9, located between a discharge opening 7 in the lower part 6 of a cyclone separator 2 and a return pipe 8, has also been connected to an inlet duct 17 of a second cyclone separator 16. A gas discharge pipe 23 in the upper part of the separator 16 is connected to a flue gas fan 19 via a flue gas duct 18. An ejector 21, into which compressed air is supplied via a pipe 22, is disposed in a solid particle discharge pipe 20 that is connected to the lower part of the separator 16. The lower end of the discharge pipe is connected to a combustion chamber 14 of the reactor 1.

From the lower part of the cyclone separator 2 flue gas is drawn into the cyclone separator 16 by means of the flue gas fan 19. Fine dust particles transported with the flue gas are separated in the separator 16 and returned to the vortex chamber of the reactor by means of the ejector 21, while flue gas is led to the flue gas duct 18 via discharge pipe 23.

By means of the method and the apparatus according to the invention, not only coarse particles concentrated on the walls of the vortex chamber, but also a considerable part of the fine particles can be separated from the flue gases and returned to the reactor. Thus, the separation degree of the separator improves and more such material is recuperated that did not have sufficient time to react when flowing through the combustion chamber.

The invention is not limited to the above embodiments, but it can be modified and applied within the inventive concept defined by the claims.

What is claimed is:

1. A method of separating coarse and fine solid particles from flue gases in a circulating fluidized bed reactor comprising the steps of:

(a) leading flue gases containing coarse and fine solid particles from an upper part of the reactor to a vortex chamber disposed within a cyclone separator;
(b) providing a return duct beneath a discharge opening in a lower part of the vortex chamber and returning coarse particles discharged from said separator through said duct to the reactor;
(c) providing a suction chamber between the discharge opening and the return duct and applying suction through a suction pipe opening into said suction chamber to remove fine particles discharged from said separator; and
(d) returning said fine particles to the reactor through the suction pipe.

2. The method according to claim 1 further comprising applying the suction with a compressed air stream supplied to an ejector pump connected to said suction pipe.

3. The method according to claim 1 further comprising discharging from the separator 1–30% of the flue gases from the reactor with the coarse and fine solid particles.

4. The method according to claim 3 and further comprising returning the flue gases discharged with the solid coarse and fine particles from the separator to the reactor as a secondary gas.

5. The method according to claim 1 further comprising discharging from the separator about 10% of the flue gases from the reactor with the coarse and fine solid particles.

6. The method according to claim 1 further comprising separating and discharging a major portion of the flue gases from the reactor in the cyclone separator before the coarse and fine solid particles are discharged from the separator.

7. Apparatus for separating coarse and fine solid particles from flue gases leaving a circulating fluidized bed reactor, said apparatus comprising a first cyclone separator including inlet means for receiving flue gases from an upper portion of a reactor, said first cyclone separator including an upper part provided with a first flue gas discharge pipe and a funnel shaped lower part provided with a discharge opening operatively connected to a return duct for returning coarse particles to a reactor; a suction chamber located between and connected to the discharge opening and the return duct; and suction means for removing fine particles discharged from said first cyclone separator for returning the fine particles to a reactor separately from the coarse particles.

8. The apparatus according to claim 7 wherein the suction means comprises a pneumatic ejector.

9. The apparatus according to claim 7 further including a second cyclone separator having a gas inlet duct and wherein the suction chamber is connected to said gas inlet duct of said second cyclone separator.

10. The apparatus according to claim 9 wherein the suction means comprises a pneumatic ejector disposed in a solid particle discharge pipe connected to a lower portion of said second cyclone separator.

11. The apparatus according to claim 10 wherein the second cyclone separator includes a second flue gas discharge pipe and wherein said first and second flue gas discharge pipes are connected to a common flue gas duct.

* * * * *